US008699362B2

(12) United States Patent
Ariyoshi et al.

(10) Patent No.: US 8,699,362 B2
(45) Date of Patent: Apr. 15, 2014

(54) RADIO COMMUNICATION METHOD, RADIO COMMUNICATION DEVICE, RADIO COMMUNICATION PROGRAM, AND RADIO COMMUNICATION SYSTEM

(75) Inventors: Masayuki Ariyoshi, Tokyo (JP); Kazushi Muraoka, Tokyo (JP); Takeo Fujii, Tokyo (JP); Mai Ohta, Tokyo (JP)

(73) Assignees: NEC Corporation, Tokyo (JP); The University of Electro-Communications, Tokyo (JP)

( * ) Notice: Subject to any disclaimer, the term of this patent is extended or adjusted under 35 U.S.C. 154(b) by 972 days.

(21) Appl. No.: 12/808,721

(22) PCT Filed: Dec. 12, 2008

(86) PCT No.: PCT/JP2008/073134
§ 371 (c)(1),
(2), (4) Date: Jun. 17, 2010

(87) PCT Pub. No.: WO2009/084464
PCT Pub. Date: Sep. 7, 2009

(65) Prior Publication Data
US 2011/0228683 A1    Sep. 22, 2011

(30) Foreign Application Priority Data

Dec. 28, 2007  (JP) .................................. 2007-341262
Nov. 10, 2008  (JP) .................................. 2008-287739

(51) Int. Cl.
*H04J 1/16*  (2006.01)

(52) U.S. Cl.
USPC .................. 370/252; 455/67.11; 455/509

(58) Field of Classification Search
None
See application file for complete search history.

(56) References Cited

U.S. PATENT DOCUMENTS

2004/0145775 A1*  7/2004  Kubler et al. ............... 358/1.15
2006/0128323 A1   6/2006  Fujimoto
2008/0069033 A1*  3/2008  Li et al. ...................... 370/328

FOREIGN PATENT DOCUMENTS

| JP | 3670445 A | 1/1999 |
| JP | 11027231 A | 1/1999 |
| JP | 2001-148678 A | 5/2001 |
| JP | 2007-088941 A | 4/2007 |
| WO | WO-2004/075438 A1 | 9/2004 |
| WO | WO-2004/095748 A1 | 11/2004 |

OTHER PUBLICATIONS

Mai Ota et al.; "An OFDM Subcarrier Mapping Based Information Exchanging Method for Cooperative Sensing"; IEICE Technical Report, vol. 108, No. 62, May 22, 2008, pp. 37-42, SR2008-7.

(Continued)

*Primary Examiner* — Jianye Wu
(74) *Attorney, Agent, or Firm* — Dickstein Shapiro LLP

(57) ABSTRACT

In cooperative sensing in which a plurality of cognitive radio apparatus collaboratively exchange sensing information on a status of frequency band usage as a secondary system, the sensing information is efficiently exchanged in the secondary system without influencing communication of the primary system. In a radio communication system according to this invention, a first radio communication device includes means for observing a surrounding radio communication environment, means for converting information obtained by the observation into a parameter used for radio communication, and means for performing transmission by using the parameter, and a second radio communication device includes means for receiving a signal transmitted from the first radio communication device and means for extracting, from the received signal, information on the surrounding radio communication environment that is observed on a transmission side.

27 Claims, 9 Drawing Sheets

(56) References Cited

OTHER PUBLICATIONS

Mai Ota et al.; "An OFDM Based Information Exchange for Cooperative Sensing in Cognitive Radio Systems"; Proceedings of the 2008 IEICE General Conference Tsushin 1, Mar. 5, 2008, p. 617, B-17-15.

Munehiro Matsui et al.; "Cooperative spectrum sensing for cognitive radio"; IEICE Communications Society Conference 2006 Koen Ronbunshu 1, Sep. 7, 2006, p. 521, B-17-11.

Jinkang Zhu et al.; "Proposal of Parallel Combinatory Spread Spectrum Communication System"; The Transactions of the Institute of Electronics, Information and Communication Engineers B-II, vol. J 74-B-II, No. 5, May 25, 1991, pp. 207-214.

Naotaka Shibata et al.; "Impact of Power Control and Access Control on Area Spectral Efficiency in Radio System with Shared Band": IEICE Technical Report, vol. 106, No. 555, Feb. 28, 2007; pp. 119-122, RCS2006-236-284.

Noriyuki Takeda et al.; "A Study of the Control Frame for Cognitive Radio Communication"; IEICE Communications Society Conference 2006 Koen Ronbunshu 1, Sep. 7, 2006, p. 536, B-17-26.

Hiromasa Uchiyama et al.; "Study on Cooperative Sensing in Cognitive Radio based Ad-hoc Network"; IEICE Technical Report, vol. 106, No. 479, Jan. 18, 2007, pp. 109-113, RCS2006-213.

Shridhar M. Mishra et al.; "Cooperative Sensing among Cognitive Radios"; Proc of IEEE International Conference on Communications (ICC) 2006.

Danijela Cabric, et al.; "Implementation Issues in Spectrum Sensing for Cognitive Radios"; Proc of the Thirty-Eighth Asilomar Conference on Signals, Systems and Computers, Nov. 2004.

International Search Report for International Application No. PCT/JP2008/073134, date of mailing Mar. 24, 2009.

Written Opinion (in Japanese Language), dated Mar. 24, 2009 and English translation of relevant parts issued for International Application No. PCT/JP2008/073134.

* cited by examiner

RADIO COMMUNICATION METHOD, RADIO COMMUNICATION DEVICE, RADIO COMMUNICATION PROGRAM, AND RADIO COMMUNICATION SYSTEM

TECHNICAL FIELD

This invention relates to a radio communication system having a function of cognizing a surrounding radio environment, a radio communication method, a radio communication device, and a radio communication program, and more particularly, to a radio communication method in which a plurality of radio apparatus cognize a radio environment in collaboration with each other, a radio communication device, a radio communication program, and a radio communication system.

BACKGROUND ART

There is known a technology of adaptively changing radio parameters according to a surrounding radio environment (refer to Patent Document 1: WO 2004/075438 A1, or Patent Document 2: JP 3670445 B2). There have been proposed a variety of cognitive radio communication systems that use such a technology to improve a frequency usage efficiency.

In cognitive radio, a surrounding radio environment is cognized and radio parameters are optimized according to the radio environment. In particular, as a secondary system, a cognitive radio system shares a frequency band that is the same as a frequency band allocated to an existing radio communication system (primary system), to thereby improve the frequency usage efficiency.

From a viewpoint of protecting the existing system, a basis of sharing a frequency band is that the primary system preferentially uses a frequency band that is allocated thereto in advance and the secondary system does not influence the primary system. Therefore, the secondary system is required to avoid interference to the primary system by, for example, using a frequency band that is not used by the primary system, or controlling transmission power to be smaller than an interference amount allowed by the primary system. In order to achieve this, the secondary system needs to correctly recognize a status of frequency band usage of the primary system, which is to be used by the secondary system.

Situations in which the secondary system recognizes the status of frequency band usage may be classified into two main types. One type corresponds to a case in which, before performing communication, the secondary system detects communication of the primary system in a wide candidate frequency band that may be shared with the secondary system. The other type corresponds to a case in which the secondary system detects the primary system that has started communication in a frequency band that is being used by the secondary system. In both of the cases, if the secondary system detects communication of the primary system, the secondary system needs to take a measure to avoid the interference to the primary system in the corresponding frequency band.

As a specific method of detecting existence of communication of the primary system, there is spectrum sensing in which a radio apparatus of the secondary system detects a signal in its surrounding. Spectrum sensing includes a method based on power detection in which determination is performed based on a magnitude of a received signal power determined based on a time average, and a method in which a feature amount contained in a transmitted signal of the primary system is used for detection. As the feature amount of the signal, cyclostationarity, a pilot signal, or the like contained in the transmitted signal of the primary system may be used (for example, Non-patent Document 1: D Cabric, S M Mishra, and R W Brodersen, "Implementation issues in spectrum sensing for cognitive radios," Proc of the Thirty-Eighth Asilomar Conference on Signals, Systems and Computers, November 2004.).

However, spectrum sensing performed by individual secondary system radio apparatus involves a problem that secure detection of the primary system is difficult due to influences of a surrounding radio propagation environment, including fading, shadowing, and distance attenuation. As a solution thereto, there has been studied a cooperative sensing scheme in which a detection accuracy is increased by combining spectrum sensing functions of a plurality of radio apparatus (for example, Non-patent Document 2: Shridhar M Mishra, Anant Sahai and Robert W Brodersen, "Cooperative Sensing among Cognitive Radios," Proc of IEEE International Conference on Communications (ICC) 2006.).

FIG. 1 is a system conceptual diagram of cooperative sensing. In the example illustrated in the figure, as a primary system, a radio apparatus 100 and a radio apparatus 110 communicate with each other. As a secondary system, radio apparatus 200, 210, 220, 230, and 240 share the same frequency band as that of the primary system. Here, the radio apparatus 200, 210, 220, 230, and 240 of the secondary system constitute a cooperative group in which the radio apparatus 200, 210, 220, 230, and 240 collaborate with each other in terms of a spectrum sensing function. Among the radio apparatus, the radio apparatus 200 functions as a master node, controls each of the radio apparatus in the cooperative group, and makes, as the cooperative group, a determination on detection of whether or not communication of the primary system exists. The other radio apparatus 210, 220, 230, and 240 function as slave nodes that perform a cooperative sensing operation according to an instruction issued by the master node.

A basic operation of cooperative sensing is as follows. The plurality of slave nodes 210, 220, 230, and 240 belonging to the cooperative group perform spectrum sensing on a target frequency band. The plurality of slave nodes 210, 220, 230, and 240 notify results thereof to the master node 200. The master node integrates notified detection information pieces to determine whether or not the communication of the primary system exists in the target frequency band. Here, a spectrum sensing method used at the slave node may be the method disclosed in Non-patent Document 1 or another method, and is not specifically limited. Further, the master node 200 may make a determination by using detection information collected from a part of the slave nodes, or by using detection information obtained by the master node itself performing the spectrum sensing in addition to the detection information collected from the slave nodes.

In this manner, in cooperative sensing, influences of a radio propagation environment may be alleviated by virtue of a configuration in which the secondary system radio apparatus are spatially distributed. Therefore, detection performance may be improved in comparison with spectrum sensing performed by individual secondary system radio apparatus.

DISCLOSURE OF THE INVENTION

Problems to be Solved by the Invention

With regard to such an information exchange for cooperative sensing, various studies have been conducted on a method of improving a sensing accuracy until now, but a way of exchanging information in an actual operation has not been studied. In cognitive radio, it is necessary to determine whether or not communication of the secondary system is possible under existence of the primary system, and hence sensing information need to be exchanged before communicating data. Therefore, an exchange method that gives no influence on the primary system is needed. Further, in a case where a plurality of terminals individually exchange packets with each other for exchanging information, there arises a problem that the exchanged packets occupy a radio band if the number of cooperating radio apparatus is large.

It should be noted that in the technologies disclosed in Patent Document 1 and Patent Document 2, transmission parameters to be used or an operation environment are notified, but no observation result is transmitted.

Therefore, it is an object of this invention to provide a method in which sensing information is capable of being exchanged in a secondary system without influencing communication of a primary system.

Further, it is another object of this invention to provide a system for allowing radio apparatus in a secondary system to efficiently use radio resources, to thereby exchange necessary sensing information.

Means to Solve the Problems

According to one aspect of this invention, there is provided a radio communication method including: generating an observation result by observing one's own or surrounding radio communication environment; converting observation information representing the observation result into a parameter used for a radio communication; and transmitting the observation information by using the parameter.

According to another aspect of this invention, there is provided a radio communication device including: means for generating an observation result by observing one's own or surrounding radio communication environment; means for converting observation information representing the observation result into a parameter used for a radio communication; and means for transmitting the observation information by using the parameter.

According to still another aspect of this invention, there is obtained a cognitive radio communication system including a first radio communication device and a second radio communication device, in which the first radio communication device includes: means for generating an observation result by observing a surrounding radio communication environment; means for converting observation information representing the observation result into a parameter used for radio communication; and means for transmitting the observation information by using the parameter, and the second radio communication device includes: means for receiving a signal transmitted from the first radio communication device; and means for extracting, from the received signal, received observation information representing the observation result obtained by observing the surrounding radio communication environment on a transmission side.

Therefore, according to this invention, there may be provided a method in which the sensing information is exchanged in the secondary system without influencing the communication of the primary system. Further, according to this invention, the radio apparatus in the secondary system are allowed to efficiently use the radio resources, to thereby collect the necessary sensing information.

BEST MODE FOR EMBODYING THE INVENTION

A detailed description is made of best mode for embodying this invention with reference to the drawings.
[First Embodiment]

Figure 1:
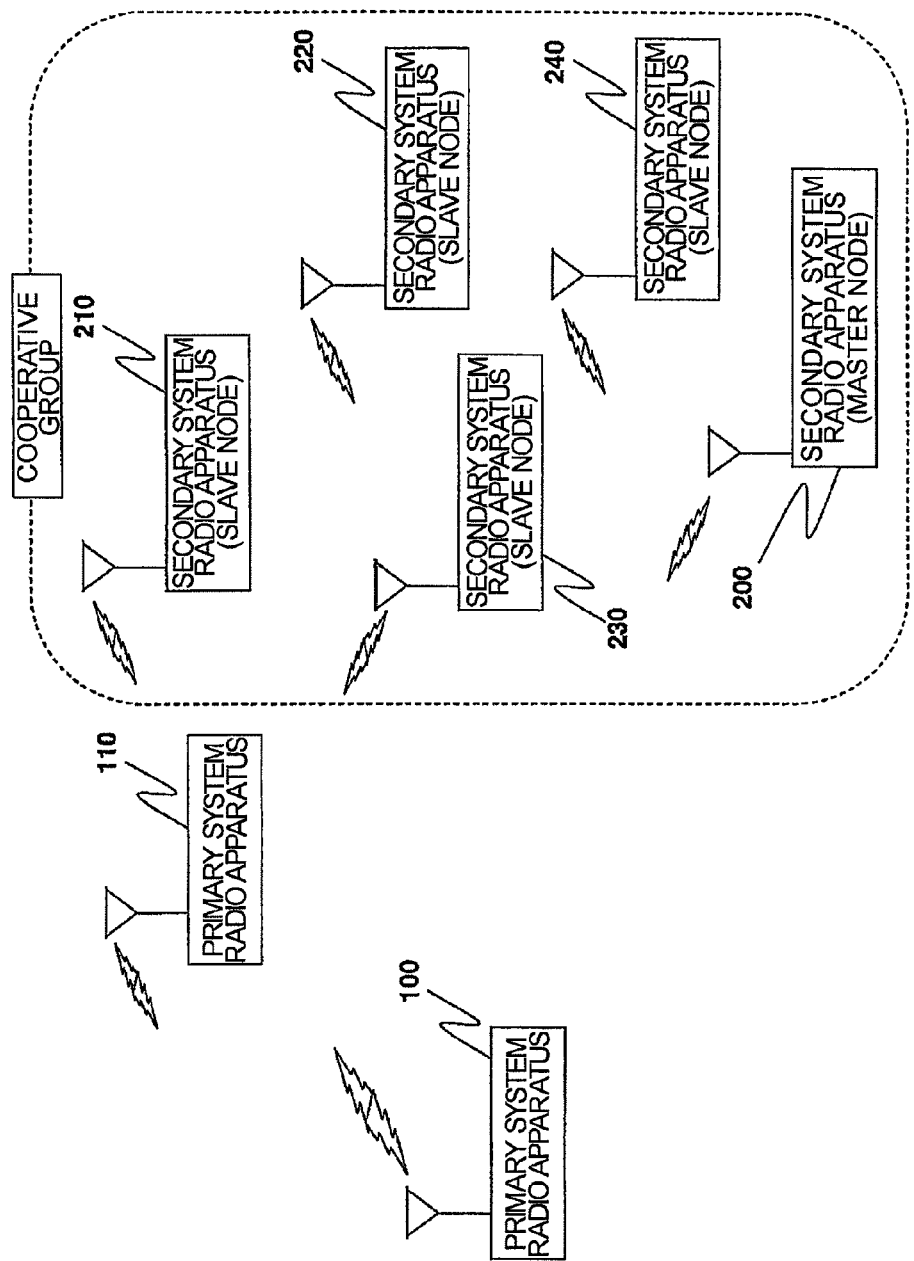
FIG. 1 is a schematic diagram illustrating a configuration in which radio apparatus of a primary system and radio apparatus of a secondary system which perform cooperative sensing coexist, to which this invention is applied.

In a first embodiment of this invention described below, there is given an example of cooperative sensing performed by a master node 200 and slave nodes 210 to 240 constituting a cooperative group in the same configuration as in FIG. 1. Here, as an example, a secondary system in the cooperative group performs communication based on orthogonal frequency division multiplexing (OFDM) or orthogonal frequency division multiple access (OFDMA). In the following description, for simplicity, OFDM or OFDMA is simply referred to as OFDM.
[Configuration and Operation of Master Node (Upper Level)]

Figure 2:
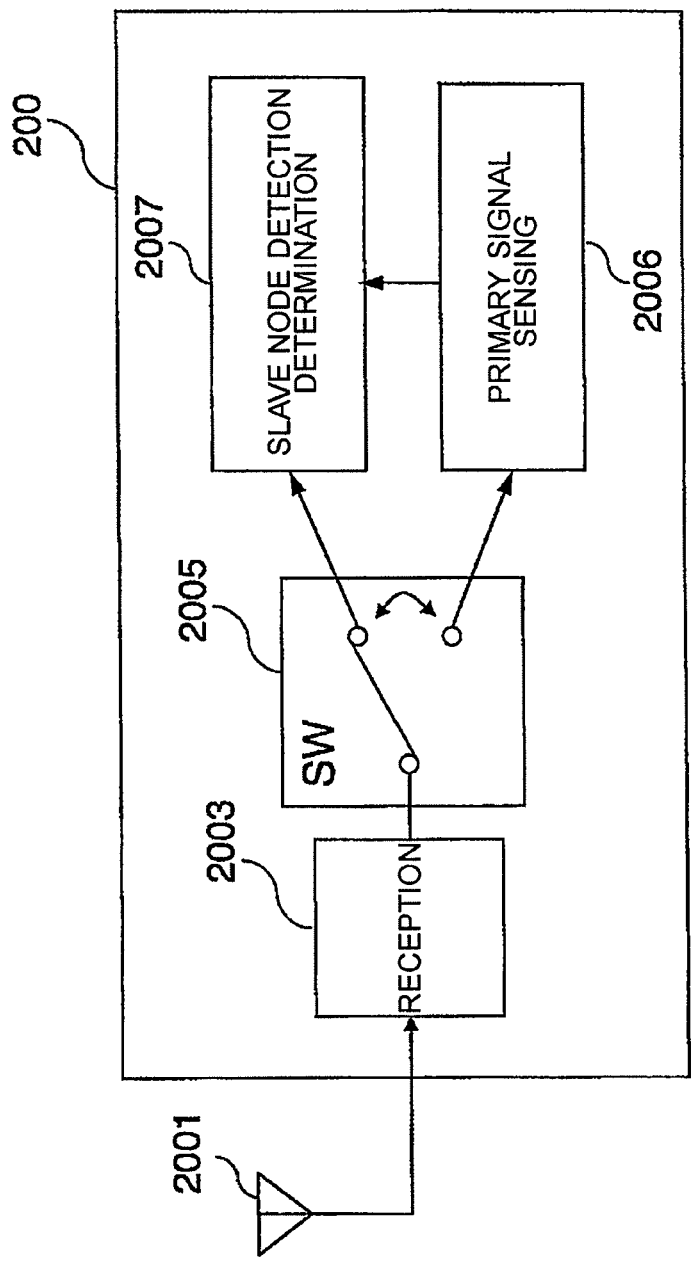
FIG. 2 is a block diagram illustrating an example of a configuration of a master node that performs the cooperative sensing according to a first or second embodiment of this invention.

FIG. 2 illustrates an example of a configuration of the master node 200 according to the first embodiment of this invention. The master node 200 according to the first embodiment of this invention includes an antenna 2001, reception means 2003, a switch 2005, primary signal sensing means 2006, and slave node detection determination means 2007.

The reception means 2003 receives signals of the primary system and signals of the secondary system. Specifically, for example, the reception means 2003 may receive signals transmitted from primary system radio apparatus 100 and 110, or signals transmitted from the other nodes belonging to the cooperative group, for example the slave nodes 210 to 240.

The switch 2005 switches processing means to be connected in a subsequent stage according to a purpose of processing an output from the reception means 2003. For example, if the master node 200 itself performs sensing on a primary signal, the switch 2005 connects to the primary signal sensing means 2006, and if the master node 200 performs detection determination using received signals from the slave nodes, the switch 2005 connects to the slave node detection determination means 2007.

The primary signal sensing means 2006 performs detection of whether or not communication of the primary system exists, a reception power intensity (level), traffic, or the like in a frequency band to which spectrum sensing is applied. A result thereof is passed to the slave node detection determination means 2007.

The slave node detection determination means 2007 extracts information on results of spectrum sensing performed at the slave nodes 210 to 240, which are contained in the received signals from the slave nodes, and uses the result of the spectrum sensing performed by the primary signal sensing means 2006 itself to comprehensively determine whether or not the communication of the primary system exists in the target frequency band in the cooperative group. It should be noted that, in the comprehensive determination, the result of the spectrum sensing performed by the primary signal sensing means 2006 itself is desirably taken into consideration, but not necessarily need to be taken into consideration, and it is also possible that only the information on the results of the spectrum sensing performed at the slave nodes is used in the comprehensive determination.

[Configuration and Operation of Master Node (Detection Determination Section)]

Figure 3:
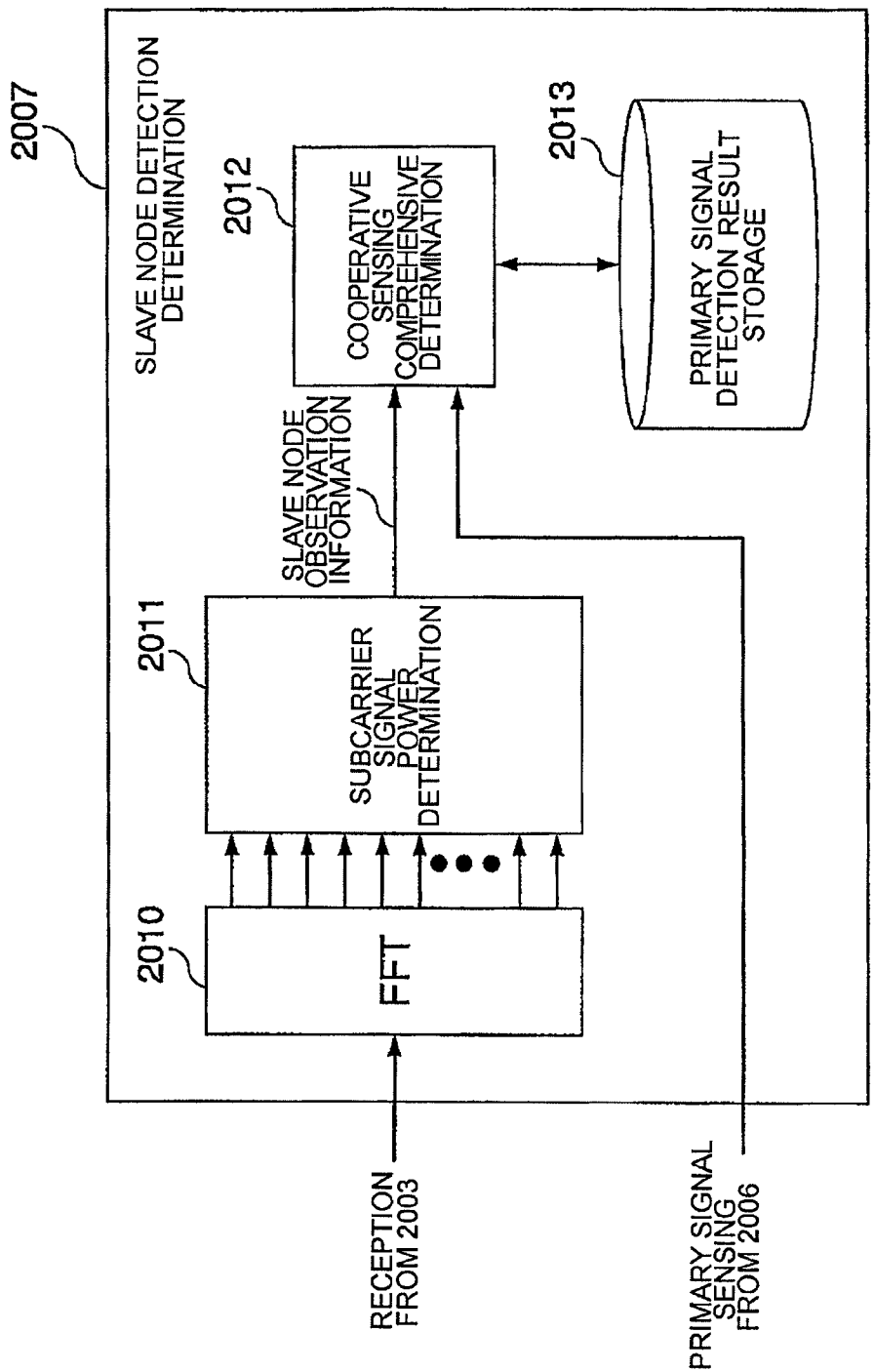
FIG. 3 is a block diagram illustrating an example of a configuration of slave node detection determination means included in the master node of FIG. 2.

FIG. 3 illustrates an example of a configuration of the slave node detection determination means 2007 of the master node 200 according to the first embodiment of this invention. The slave node detection determination means 2007 includes discrete Fourier transform (FFT) processing means 2010, subcarrier signal power determination means 2011, cooperative sensing comprehensive determination means 2012, and primary signal detection result storage means 2013.

In a case where the detection determination is performed using the received signals from the slave nodes, the received signal obtained from the reception means 2003 is converted into a signal on a frequency axis at the FFT processing means 2010. Here, as described below, the received signal from the slave nodes has the information on the results of the spectrum sensing performed at the slave nodes carried on OFDM subcarriers. The information may be extracted from the signal on the frequency axis. Accordingly, the subcarrier signal power determination means 2011 may observe subcarrier components of the received signal, to thereby obtain sensing information of the slave nodes. The cooperative sensing comprehensive determination means 2012 uses the obtained sensing information of each of the slave nodes and the result of the spectrum sensing performed by the master node 200 itself, which is obtained from the primary signal sensing means 2006 to comprehensively determine a surrounding frequency usage environment in the cooperative group, for example, whether or not the signal of the primary system exists. Further, the cooperative sensing comprehensive determination result may be stored in the primary signal detection storage means 2013, and be used as previously stored information (any one of or a combination of a previous cooperative sensing comprehensive determination result, a previous sensing result generated by the slave node, and a previous sensing result generated by the master node) in subsequent cooperative sensing comprehensive determinations.

[Configuration and Operation of Slave Node]

Figure 4:
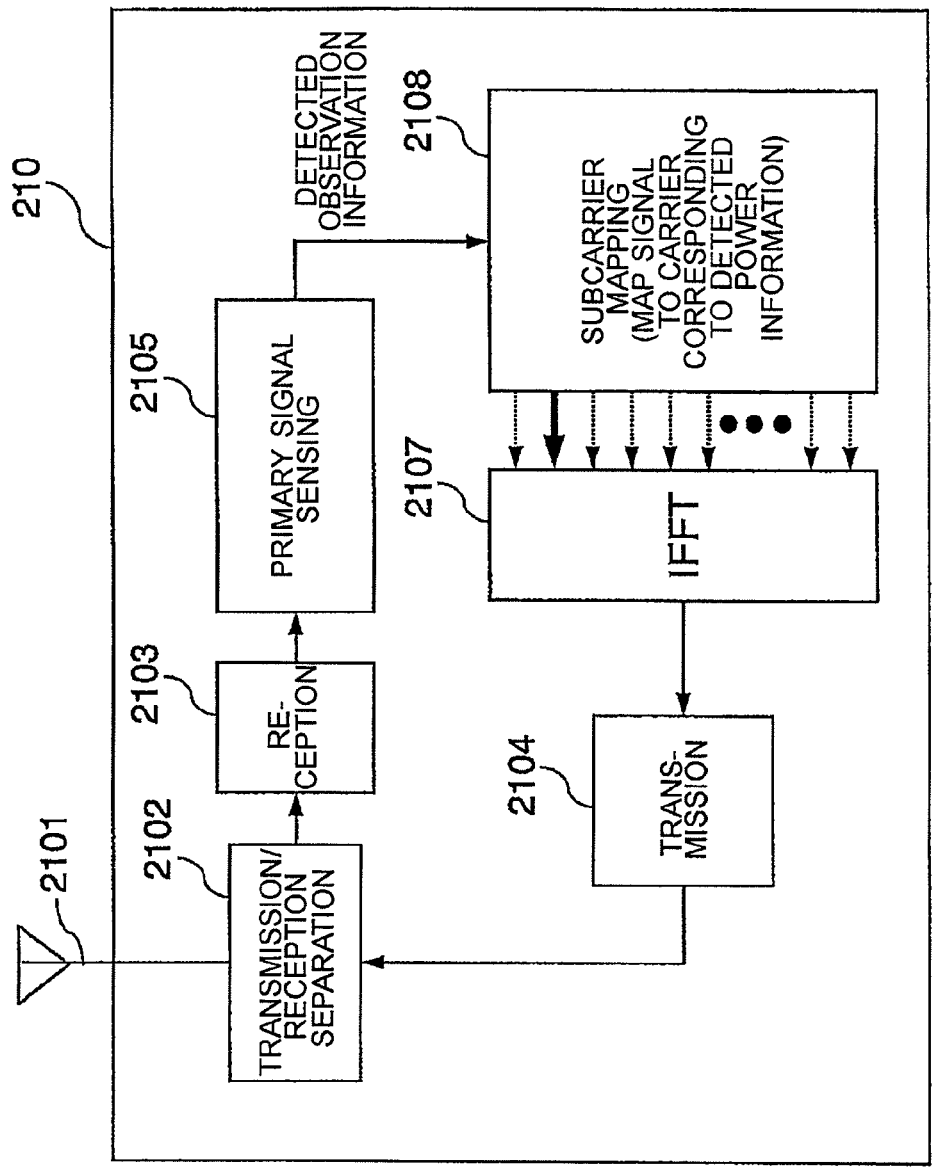
FIG. 4 is a block diagram illustrating a configuration of a slave node that performs the cooperative sensing according to the first or second embodiment of this invention.

FIG. 4 illustrates an example of a configuration of the slave node 210 according to the first embodiment of this invention. It should be noted that configurations of the other slave nodes 220 to 240 are similar to that of the slave node 210. The slave node 210 according to the first embodiment of this invention includes an antenna 2101, transmission/reception separation means 2102, reception means 2103, transmission means 2104, primary signal sensing means 2105, inverse discrete Fourier transform (IFFT) processing means 2107, and subcarrier mapping means 2108.

The reception means 2103 performs reception processing on a signal transmitted from another node belonging to the cooperative group, for example, the master node 200.

The primary signal sensing means 2105 performs detection of whether or not the communication of the primary system exists, the reception power intensity (level), the traffic, or the like in the frequency band to which the spectrum sensing is applied. Here, for example, it is assumed that a reception power intensity in a target frequency band is detected. However, this invention is not limited thereto.

Figure 5:
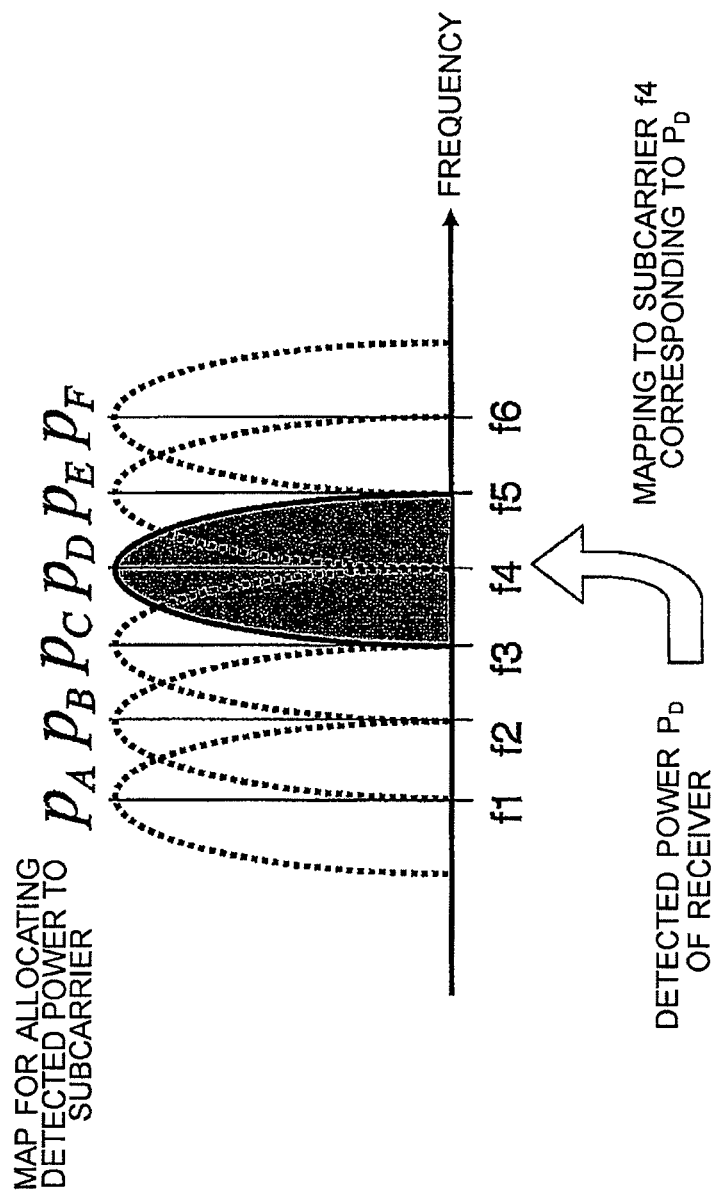
FIG. 5 is a diagram illustrating an example of a map for allocating detected power to an OFDM subcarrier according to the first embodiment of this invention.

The subcarrier mapping means 2108 performs signal mapping on an OFDM subcarrier corresponding to detected power information based on the sensing result obtained from the primary signal sensing means 2105. FIG. 5 illustrates an example of a map for allocating a detected power to an OFDM subcarrier. As illustrated in FIG. 5, OFDM subcarriers f1 to f6 are associated with detected power levels $P_A$ to $P_F$, respectively. For example, if a power level detected in the receiver corresponds to $P_D$, the power level is mapped to the subcarrier f4. Alternatively, this mapping processing may be regarded as a function of quantizing received power information (reception power intensity) and encoding the power information into a subcarrier number. In other words, a detected reception power level is quantized to be any one of quantization levels $P_A$ to $P_F$ with a uniform quantization width obtained by equally dividing a dynamic range, and converted into subcarriers respectively associated with the quantization levels. The subcarrier mapping means 2108 generates an OFDM signal containing a signal composed of only a subcarrier component corresponding to the detected power level.

After that, the OFDM signal is converted into a signal on a time axis at the IFFT processing means 2107, and then transmitted to the master node via the transmission section 2104.

The slave nodes 210 to 240 are usually positioned in locations different to each other, and hence the respective detected reception power levels are highly likely to be different to each other. Therefore, if the detected power levels $P_A$ to $P_F$ are associated with the OFDM subcarriers f1 to f6, the OFDM signals transmitted from the slave nodes are highly likely to have different subcarrier components. As a result, the secondary system radio apparatus may exchange the sensing information with each other without influencing the communication of the primary system.

[Receiving Sensing Information at Master Node]

According to the first embodiment of this invention, each of the slave nodes belonging to the cooperative group performs the spectrum sensing as described above, and transmits the detected power level information in an OFDM scheme as a signal having a predetermined subcarrier component. In a case where those OFDM signals are simultaneously transmitted from the plurality of slave nodes, the master node serving as a receiver receives an OFDM signal having signals contained in only subcarrier components corresponding to power levels detected by the surrounding slave nodes. The master node may observe the subcarrier components of the received OFDM signal, to thereby obtain information on sensing results generated by the surrounding slave nodes.

Figure 6:
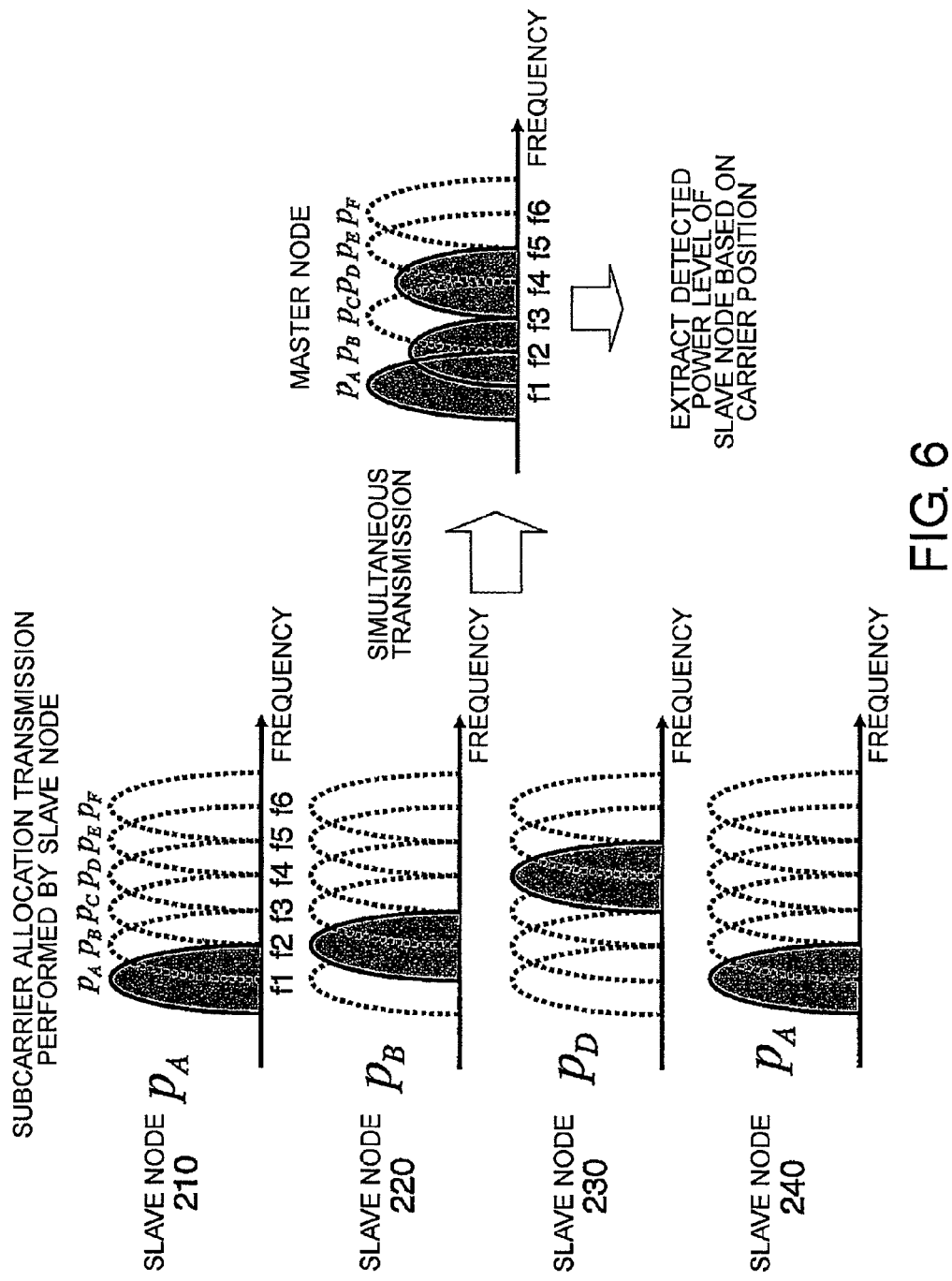
FIG. 6 is a conceptual diagram of an operation of allocating a sensing result generated by the slave node to a subcarrier, transmitting the sensing result, and extracting a sensing result power level of the slave node based on a subcarrier position at the master node according to the first embodiment of this invention.

FIG. 6 illustrates an example of the above-mentioned situation. The figure illustrates a situation in which detected power levels obtained as results of the spectrum sensing performed by the slave nodes 210 to 240 correspond to $P_A$, $P_B$, $P_D$, and $P_A$, respectively, are mapped to the respective determined subcarriers, and are simultaneously transmitted in an OFDM scheme. As illustrated in the figure, on reception of OFDM signals simultaneously transmitted from the slave nodes 210 to 240, the master node may observe signal components in the subcarriers f1, f2, and f4. As a result, it is found that there exist the slave nodes that have detected the power levels of $P_A$, $P_B$, and $P_D$ in the cooperative group.

[Effect of This Embodiment]

As described above, according to the first embodiment of this invention, it is possible that the primary system is cognized without fail, and, on that basis, the secondary system efficiently uses radio resources to allow the exchange of the sensing information without influencing the communication of the primary system.

It should be noted that, in the embodiment described above, the master node is distinguished from the slave node, but all the radio apparatus may have the same configuration, and each of the radio apparatus may operate as the master node as well as the slave node. In this case, for example, the radio apparatus serving as a sender may operate as the master node.

Further, in the embodiment described above, the example in which the surrounding communication environment is observed to transmit the observation result is described, but the radio apparatus may notify a result of observing its own state, for example, a remaining battery charge.

[Second Embodiment](Example Application of Subcarrier Mapping)

According to this invention, based on the first embodiment described above, functions may be extended as follows.

Next, a description is given of a second embodiment of this invention. In the first embodiment of this invention, a unit of quantization of the detected power level obtained as a result of the spectrum sensing is mapped to one OFDM subcarrier. However, a plurality of candidate subcarriers may be provided for the unit. For example, if four subcarriers, that is, OFDM subcarriers f100, f101, f102, and f103 are allocated to a detected power level $P_x$, obtained as a result of the spectrum sensing, a slave node that has the detected power level of $P_X$ selects one from the subcarriers f100 to f103 in a random manner, for example. In this case, a collision probability at a time of reception at the master node may be reduced to be ¼ in comparison with a case where one candidate subcarrier is allocated. With this configuration, a possibility that the exchange of the sensing information among the radio apparatus of the secondary system influences the communication of the primary system may be further reduced.

Figure 7:
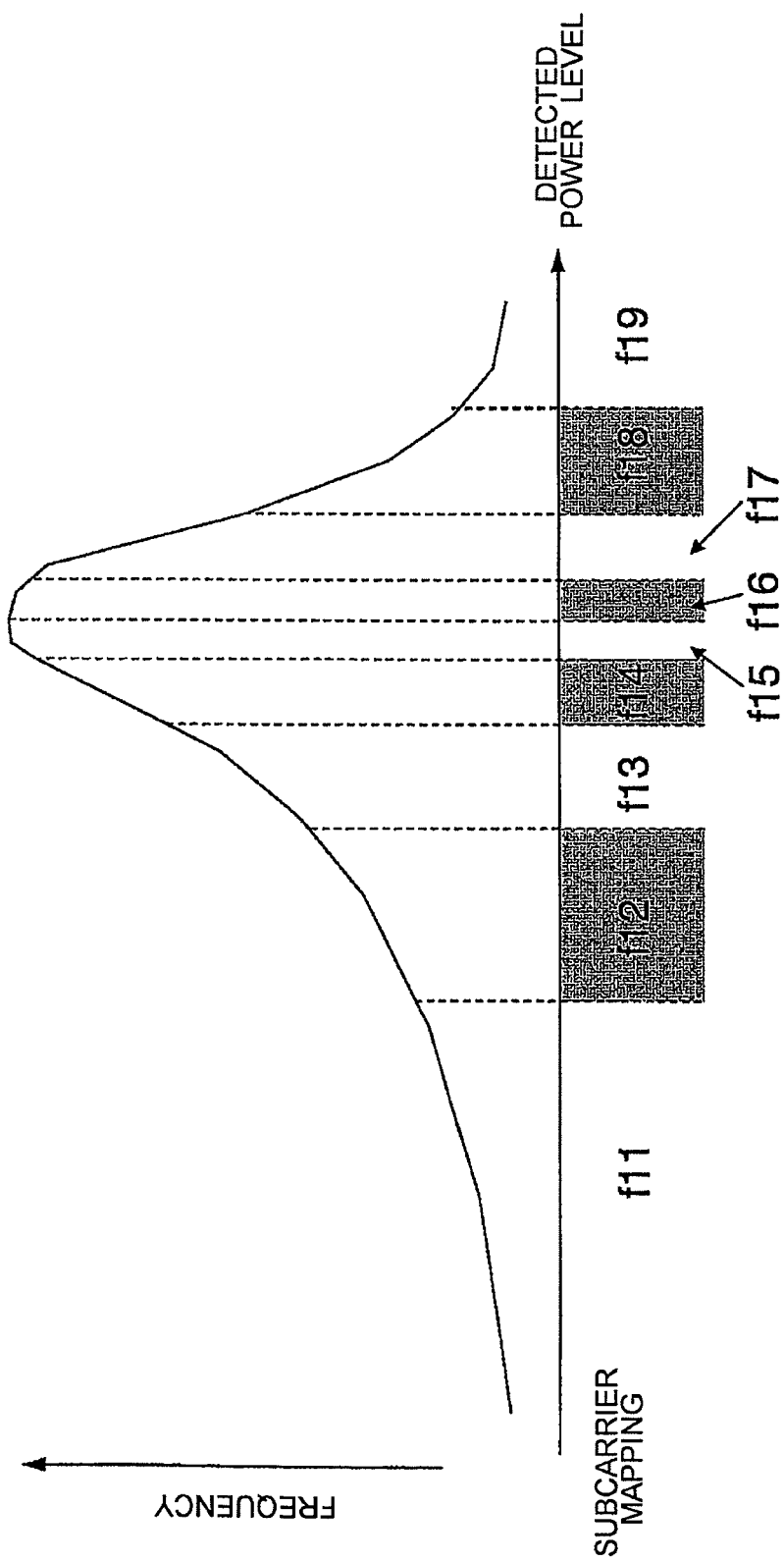
FIG. 7 is a diagram illustrating an example of a map for allocation to an OFDM subcarrier according to a detected power frequency distribution according to the second embodiment of this embodiment.

Further, as another example application of the second embodiment of this invention, as illustrated in FIG. 7, a width of quantization of a result of the spectrum sensing may be varied according to a frequency distribution. As illustrated in the figure, by narrowing the width of quantization more as a frequency is higher, subcarriers each having a signal component may be distributed in a signal received by the master node. It should be noted that as illustrated in FIG. 7, as the frequency becomes higher, the width of quantization becomes narrower, and further, a plurality of subcarriers may be naturally allocated to a unit of quantization.

Further, as still another example application, there may be a method in which a width for the subcarrier allocation may be further divided mainly for a range in which the master node hopes to conduct the more detailed cooperative sensing.

[Third Embodiment](Example Application in which Subcarrier Mapping is Varied According to Instruction Issued by Master Node)

Next, a description is given of a third embodiment of this invention. In this embodiment, the subcarrier mapping as described as the first or second embodiment of this invention may be varied according to an instruction issued by the master node.

Figure 8:
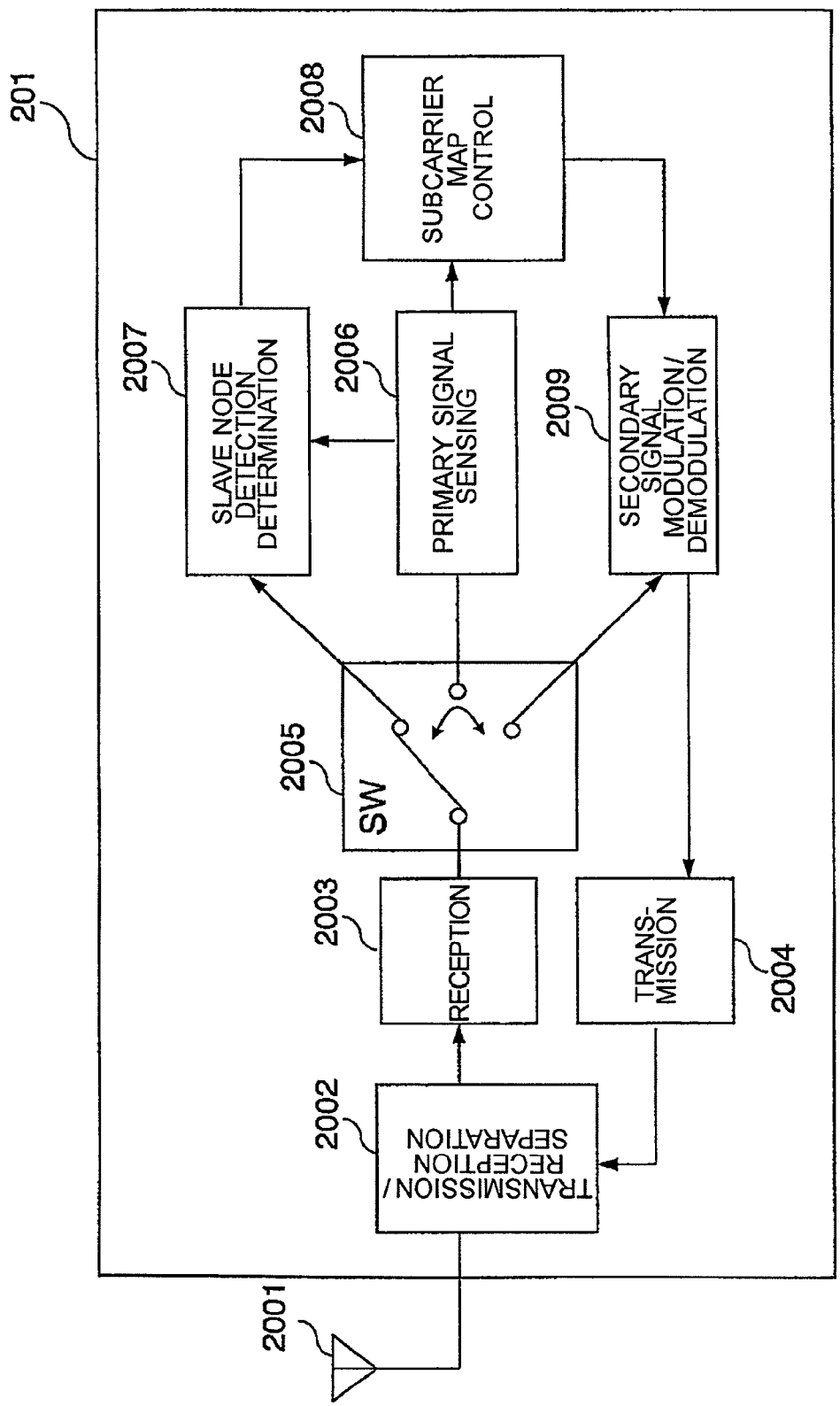
FIG. 8 is a block diagram illustrating an example of a configuration of a master node that performs the cooperative sensing according to a third embodiment of this invention.

FIG. 8 illustrates an example of a configuration of a master node 201 according to the third embodiment of this invention. As illustrated in the figure, the master node 201 according to this embodiment has the switch 2005 extended compared with the master node 200 of the first embodiment illustrated in FIG. 2, and, additionally includes subcarrier map control means 2008, secondary signal modulation/demodulation means 2009, and transmission means 2004. The subcarrier map control means 2008 uses information given from the slave node detection determination means 2007 to determine the subcarrier mapping as described as the first or second embodiment of this invention. Here, the information given from the slave node detection determination means 2007 may be any one or a combination of sensing information obtained from each of the slave nodes as a result of the cooperative sensing, a result of a cooperative primary comprehensive determination, previous cooperative sensing information stored in the primary signal detection result storage means 2013 in addition to the above-mentioned information and result, and such other information. Further, the subcarrier map control means 2008 may use a result of the spectrum sensing performed by the primary signal sensing means 2006 itself in determining the subcarrier mapping. Subcarrier mapping information (parameter conversion reference) that has been set is modulated by the secondary signal modulation/demodulation means 2009 and transmitted to each of the slave nodes via the transmission means 2004.

Figure 9:
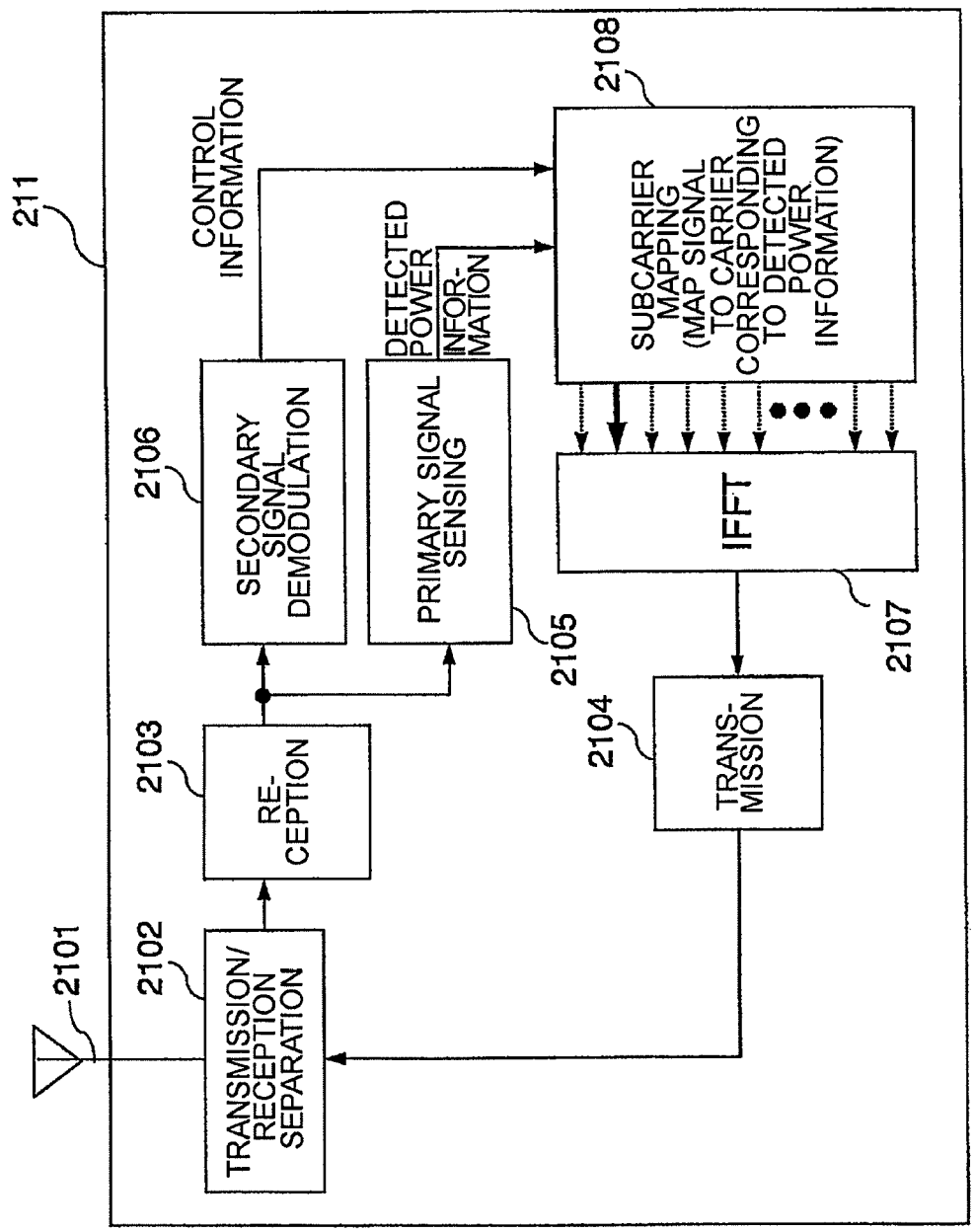
FIG. 9 is a block diagram illustrating an example of a configuration of a slave node that performs the cooperative sensing according to the third embodiment of this invention.

FIG. 9 illustrates an example of a configuration of a corresponding slave node 211. As illustrated in the figure, the slave node 211 according to this embodiment has the subcarrier mapping means 2108 extended compared with the master node 210 according to the first embodiment illustrated in FIG. 4 and additionally includes secondary signal demodulation means 2106. In the slave node 211, the secondary signal demodulation means 2106 extracts the subcarrier mapping control information from a secondary signal received from the master node and sets the subcarrier mapping according to the control information.

According to the third embodiment of this invention described above, the subcarrier mapping may be flexibly changed, to thereby allow an optimization of an arrangement of subcarriers each having a signal component in a received signal at the master node. With this configuration, the possibility that the exchange of the sensing information among the radio apparatus of the secondary system influences the communication of the primary system may be further reduced.

[Fourth Embodiment](Example Application in which Distance Between Master Node and Slave Node is Estimated Based on Subcarrier Power and is Reflected on Comprehensive Determination)

Next, a description is given of a fourth embodiment of this invention. In this embodiment, in the cooperative sensing comprehensive determination at the master node, an interrelation between the master node and the slave node is determined based on a reception power and is utilized. This utilizes a configuration in which the slave node keeps a transmission power constant when transmitting a detected power level information obtained as a result of the spectrum sensing and a received signal intensity at the master node varies according to a communication channel status in a radio zone. The communication channel status (received signal intensity) generally varies according to a distance of the radio zone, and hence an approximate distance of the radio zone may be estimated. The master node may additionally have a function of using this signal intensity information in addition to sensing result information that is provided by the slave node and carried on a received subcarrier number to perform the comprehensive determination. Further, if the master node is capable of obtaining auxiliary information such as position information of the slave node with another means, the master node may naturally use the auxiliary information to perform the comprehensive determination.

[Fifth Embodiment](Example Application in which Screening is Performed at Slave Node)

Next, a description is given of a fifth embodiment of this invention. In this embodiment, it is not only the master node that has the determination function for a result of the spectrum sensing, but also the slave node shares the determination function. Therefore, according to this embodiment, the slave node judges whether or not detected power information is to be transmitted to the master node based on a threshold for a result of the spectrum sensing and transmits the detected power information only when judging that the detected power information needs to be notified to the master node. With this configuration, the radio resources may be more effectively used in the secondary system.

[Other Embodiments](Example Application in which not Subcarrier, but Time or Code is Used)

In the above description, in the embodiments according to this invention described above, the frequency components of the OFDM subcarriers are used as a method of transmitting the spectrum sensing information from the slave nodes in the cooperative group, but this invention is not limited thereto. For example, there may be used an application method of transmitting detection results of the spectrum sensing by multiplexing the detection results so that the detection results correspond to time slots on a time axis, or that the detection results correspond to a spectrum spreading code or the like. Further, a combination of two or more of the OFDM subcarriers, the time slots, and the spectrum spreading code may be used as a parameter.

(Example Application of Power Control)

Further, in order to perform such an exchange of the cooperative sensing information using the same band as that of the primary system, an additional function may be employed for limiting transmission power when exchanging the cooperative sensing information according to an assumed primary system.

As described above, according to this invention, it is possible that the primary system is cognized without fail in the cognitive radio, and, on that basis, the radio resources are efficiently used to perform the information exchange in operating the secondary system.

It should be noted that, in the detailed description according the embodiments of this invention described above, the example in which the signal of the primary system is detected is described, but this invention may also be applied to a case where a plurality of primary systems other than the secondary system exist if the cooperative group is regarded as the secondary system.

Further, this invention is not limited to the cognitive radio in which a frequency band is secondarily used, and may also be utilized to share a frequency in terms of securing quality of a current radio LAN.

Still further, in addition to a case where an existing system to which a frequency band is statically allocated, this invention may also be applied to one of two systems (one of the systems has a preferential right of use) on which (moderate) dynamic frequency allocation is performed. Further, this invention may be applied to one of two systems for which a priority is not defined for sharing a frequency band.

A radio communication device according to another embodiment of this invention may include means for using an orthogonal frequency multiplexing subcarrier as a parameter. Further, the radio communication device may include means for using a time slot as the parameter. Alternatively, the radio communication device may include means for using a spectrum spreading code as the parameter. Still further, the radio communication device may include means for using a combination of two or more of the orthogonal frequency multiplexing subcarrier, the time slot, and the spectrum spreading code.

Further, a radio communication device according to another embodiment of this invention may include means for observing a reception power intensity generated by a surrounding radio communication as means for generating an observation result. Further, the radio communication device may include means for observing traffic generated by the surrounding radio communication as the means for generating the observation result. Alternatively, the radio communication device may include means for observing a remaining battery charge as the means for generating the observation result.

Further, in a radio communication device according to another embodiment of this invention, means for obtaining a measurement result may include means for quantizing a measurement value to obtain the measurement result.

Further, in a radio communication device according to another embodiment of this invention, the means for obtaining a measurement result may include means for quantizing the reception power intensity that has been measured with a uniform quantization width to obtain the observation result, means for performing conversion into a parameter may include means for associating measurement information representing the observation result with one of frequency subcarriers that are associated with quantization levels, respectively, and means for transmitting observation information may include means for performing orthogonal frequency multiplexing transmission with only the one of frequency subcarriers having a signal component.

Further, in a radio communication device according to another embodiment of this invention, the means for obtaining a measurement result may include the means for quantizing the reception power intensity that has been measured with the uniform quantization width to obtain the observation result, the means for performing conversion into a parameter may include means for associating the measurement information representing the observation result with one of groups of frequency subcarriers, which are associated with quantization levels, respectively, and the means for transmitting observation information may include means for performing orthogonal frequency multiplexing transmission with only a frequency subcarrier arbitrarily selected from the one of groups of frequency subcarriers having a signal component.

Further, in a radio communication device according to another embodiment of this invention, the means for obtaining a measurement result may include means for quantizing the reception power intensity that has been measured with an arbitrary nonuniform quantization width to obtain the observation result, the means for performing conversion into a parameter may include means for associating the measurement information representing the observation result with one of frequency subcarriers that are associated with quantization levels, respectively, or with one of groups of frequency subcarriers, which are associated with the quantization levels, respectively, and the means for transmitting observation information may include means for performing orthogonal frequency multiplexing transmission with only the one of frequency subcarriers or only a frequency subcarrier arbitrarily selected from the one of groups of frequency subcarriers having a signal component.

Further, in a radio communication device according to another embodiment of this invention, the means for obtaining a measurement result may include means for quantizing the reception power intensity that has been measured with a quantization width that is determined based on frequency distribution information of a reception power intensity obtained in advance and becomes narrower as a frequency is higher to obtain the observation result, the means for performing conversion into a parameter may include the means for associating the measurement information representing the observation result with one of frequency subcarriers that are associated with quantization levels, respectively, or with one of groups of frequency subcarriers, which are associated with the quantization levels, respectively, and the means for transmitting observation information may include means for performing orthogonal frequency multiplexing transmission with only the one of frequency subcarriers or only a subcarrier arbitrarily selected from the one of groups of frequency subcarriers having a signal component.

Further, in a radio communication device according to another embodiment of this invention, the means for transmitting observation information may include means for performing transmission simultaneously with another radio communication device.

Further, a radio communication device according to another embodiment of this invention may include means for receiving a signal transmitted by another radio communication device, means for extracting, from the received signal, received observation information representing an observation result obtained by observing a surrounding radio communication environment on a transmission side, means for observing the surrounding radio communication environment by itself and generating self observation information representing an observation result, and means for determining the surrounding radio communication environment by using the self observation information and the received observation information.

Further, a radio communication device according to another embodiment of this invention may include the means for observing the surrounding radio communication environment by itself and generating self observation information representing an observation result, the means for receiving a signal transmitted by another radio communication device, the means for extracting, from the received signal, received observation information representing an observation result obtained by observing a surrounding radio communication environment on a transmission side, means for using at least one of the self observation information and the received observation information to determine a parameter conversion reference for another radio apparatus to convert observation information into a parameter used for radio communication, and means for transmitting the determined parameter conversion reference.

Further, a radio communication device according to another embodiment of this invention may include means for estimating a relative distance between the radio communication device and a radio communication device on the transmission side based on received signal power of the received signal, and means for determining the radio communication environment may include means for determining the surrounding radio communication environment by using the estimated relative distance in addition to the self observation information and the received observation information.

Further, a radio communication device according to another embodiment of this invention may include means for determining whether or not transmission of the observation information is allowed by comparing the measurement result with a criterion for determination. In this case, if the means for determining whether or not transmission is allowed determines that the transmission is allowed, the means for transmitting observation information may transmit the observation information.

Further, in a radio communication device according to another embodiment of this invention, the means for transmitting observation information may include means for controlling transmission power based on a characteristic of another radio communication system to which a frequency used for the radio communication is preferentially allocated.

Further, a radio communication device according to another embodiment of this invention may be realized by causing a computer to execute the above-mentioned procedures or implement functions.

Further, in another embodiment of this invention, there may be realized a radio communication system which uses any one of the radio communication devices described above to operate under existence of a primary system to which a frequency band is preferentially allocated while sharing the same frequency band.

The invention claimed is:

1. A radio communication method, comprising:
generating observation information representing an observation result by observing one's own or surrounding environment;
quantizing the observation information with an arbitrary width of quantization to produce a quantized level;
associating the quantized level with one of frequency subcarriers or with one of groups of frequency subcarriers; and
transmitting in an OFDM scheme the observation information by using one of frequency subcarriers associated with the quantized level or one of frequency subcarriers selected from the group of frequency subcarriers associated with the quantized level.

2. A radio communication method according to claim 1, wherein the observation information comprises a reception power generated by surrounding radio communication.

3. A radio communication method according to claim 1, wherein the observation information comprises traffic generated by surrounding radio communication.

4. A radio communication method according to claim 1, wherein the observation information comprises a remaining battery charge of a radio apparatus.

5. A radio communication method, comprising:
performing, by one or a plurality of first radio apparatus, transmission based on the radio communication method according to claim 1;
receiving, by a second radio apparatus, a signal transmitted from the one or the plurality of first radio apparatus; and
extracting, from the received signal, received observation information representing an observation result obtained by the one or the plurality of first radio apparatus observing a surrounding radio communication environment.

6. A radio communication method, comprising:
performing, by one or a plurality of first radio apparatus related to a first communication system, transmission based on the radio communication method according to claim 1;
receiving, by a second radio apparatus related to a second communication system, a signal transmitted from the one or the plurality of first radio apparatus; and extracting, from the received signal, received observation information representing an observation result obtained by the one or the plurality of first radio apparatus, wherein the second radio apparatus itself separately observes a surrounding environment, and uses self observation information representing an observation result obtained by the second radio apparatus itself observing the surrounding environment and the received observation information to determine a surrounding environment of the first radio apparatus and the second radio apparatus.

7. A radio communication method according to claim 6, wherein the second radio apparatus estimates a relative distance between the second radio apparatus and the one or the plurality of first radio apparatus based on received signal power at a time of receiving a signal transmitted from the one or the plurality of first radio apparatus, and determines the surrounding environment of the one or the plurality of first radio apparatus and the second radio apparatus by using the estimated relative distance in addition to the self observation information and the received observation information.

8. A radio communication method according to claim 1, further comprising determining whether or not transmission of the observation information is allowed by comparing the observation result with a criterion for determination, and, if it is determined that the transmission is allowed, transmitting the observation information.

9. A radio communication method according to claim 1, wherein the arbitrary width of quantization is uniform.

10. A radio communication method according to claim 1, wherein the arbitrary width of quantization is nonuniform.

11. A radio communication method according to claim 1, wherein the arbitrary width of quantization is based on a distribution of frequency of the observation result and is narrower as the frequency of the observation result is higher.

12. A radio communication device, comprising:
a generator adapted to generate an observation information representing an observation result by observing one's own or surrounding environment;
a quantizer adapted to quantize the observation information with an arbitrary width of quantization to produce a quantized level;
means for associating the quantized level with one of frequency subcarriers or with one of groups of frequency subcarriers; and
a transmitter adapted to transmit in an OFDM scheme the observation information by using one of frequency subcarriers associated with the quantized level or one frequency subcarrier selected from the group of frequency subcarriers associated with the quantized level.

13. A radio communication device according to claim 12, wherein the generator adapted to generate means for generating an observation information comprises means for observing a reception power generated by surrounding radio communication.

14. A radio communication device according to claim 12, wherein the generator adapted to generate means for generating an observation information comprises means for observing traffic generated by surrounding radio communication.

15. A radio communication device according to claim 12, wherein the generator adapted to generate means for generating an observation information comprises means for observing a remaining battery charge.

16. A radio communication device according to claim 12, wherein the transmitter adapted to transmit the observation information transmits the observation information simultaneously with a transmission operation of another radio communication device.

17. A radio communication device, comprising:
a receiver adapted to receive a signal transmitted by the radio communication device according to claim 12; and
an extractor adapted to extract, from the received signal, received observation information representing the observation result of the radio communication device.

18. A radio communication device, comprising:
a receiver adapted to receive a signal transmitted by the radio communication device according to claim 12;
an extractor adapted to extract, from the received signal, received observation information representing the observation result of the radio communication device;
an observing section adapted to observe the surrounding environment by itself and generating self observation information representing an observation result; and
a determining section adapted to determine the surrounding environment by using the self observation information and the received observation information.

19. A radio communication device according to claim 18, wherein the determining section adapted to determine the surrounding environment comprises means for determining the surrounding environment by using information obtained by estimating a relative distance from the radio communication device.

20. A radio communication device according to claim 12, further comprising means for determining whether or not transmission of the observation information is allowed by comparing the observation result with a criterion for determination,
wherein if the means for determining whether or not transmission of the observation information is allowed determines that the transmission is allowed, the transmitter adapted to transmit the observation information transmits the observation information.

21. A radio communication device according to claim 12, wherein the transmitter adapted to transmit the observation information comprises a controller adapted to control transmission power based on a characteristic of another radio communication device to which a frequency used for radio communication is preferentially allocated.

22. A non-transitory computer readable recording media storing a program for causing a computer to function as the radio communication device according to claim 12.

23. A radio communication system, wherein the radio communication device according to claim 12 operates to share a same frequency band as a primary communication system to which the frequency band is preferentially allocated.

24. A radio communication device according to claim 12, wherein the arbitrary width of quantization is uniform.

25. A radio communication device according to claim 12, wherein the arbitrary width of quantization is nonuniform.

26. A radio communication device according to claim 12, wherein the arbitrary width of quantization is based on a distribution of frequency of the observation result and is narrower as the frequency of the observation result is higher.

27. A cognitive radio communication system comprising:
one or more first radio communication devices each comprising a radio communication device according to claim 12; and
one or more second radio communication devices each comprising:
means for receiving a signal transmitted from the one or more first communication devices, and
means for extracting from a received signal the observation information indicative of an observation result of the one or more first radio communication devices.

* * * * *

UNITED STATES PATENT AND TRADEMARK OFFICE
CERTIFICATE OF CORRECTION

PATENT NO. : 8,699,362 B2
APPLICATION NO. : 12/808721
DATED : April 15, 2014
INVENTOR(S) : Ariyoshi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Twenty-ninth Day of September, 2015

Michelle K. Lee
*Director of the United States Patent and Trademark Office*